United States Patent
Choi et al.

(10) Patent No.: US 12,361,175 B1
(45) Date of Patent: Jul. 15, 2025

(54) NEURAL PROCESSING DEVICE, NON-TRANSITORY COMPUTER-READABLE RECORDING MEDIUM AND METHOD FOR TRANSFERRING OWNERSHIP OF THE NEURAL PROCESSING DEVICE THEREOF

(71) Applicant: REBELLIONS INC., Seongnam-si (KR)

(72) Inventors: Myunghoon Choi, Seongnam-si (KR); Chang-Hyo Yu, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 19/086,702

(22) Filed: Mar. 21, 2025

(30) Foreign Application Priority Data

Apr. 12, 2024 (KR) .................. 10-2024-0049299

(51) Int. Cl.
*G06F 21/72* (2013.01)
*H04L 9/32* (2006.01)
*G06F 21/57* (2013.01)

(52) U.S. Cl.
CPC ............ *G06F 21/72* (2013.01); *H04L 9/3242* (2013.01); *G06F 21/575* (2013.01)

(58) Field of Classification Search
None
See application file for complete search history.

(56) References Cited

U.S. PATENT DOCUMENTS

| | | | |
|---|---|---|---|
| 8,392,762 B2 * | 3/2013 | Aralakuppe Ramegowda | G06F 11/1417 714/36 |
| 2016/0366157 A1 | 12/2016 | Smith et al. | |
| 2017/0372073 A1 * | 12/2017 | Gunti | G06F 21/575 |
| 2017/0372074 A1 * | 12/2017 | Gunti | G06F 21/575 |
| 2019/0073637 A1 | 3/2019 | Madhey | |
| 2019/0163910 A1 * | 5/2019 | Moon | G06F 21/54 |
| 2019/0303580 A1 * | 10/2019 | Ito | G06F 9/4401 |

(Continued)

FOREIGN PATENT DOCUMENTS

| | | |
|---|---|---|
| CN | 116783593 A | 9/2023 |
| KR | 10-2023-0122399 A | 8/2023 |

OTHER PUBLICATIONS

Martin Gunnarsson and Christian Gehrmann; (Secure Ownership Transfer for the Internet of Things); pp. 12; Published in (Year: 2022) by SCITEPRESS.*

*Primary Examiner* — Ali H. Cheema

(74) *Attorney, Agent, or Firm* — BROADVIEW IP LAW, PC

(57) ABSTRACT

A neural processing device, a method and a non-transitory computer-readable recording medium for transferring ownership of the neural processing device are described herein. In an implementation, the method comprising steps of executing a first stage boot loader, loading and verifying a second stage boot loader based on the first stage boot loader, executing the second stage boot loader after verification, loading and verifying ownership transfer firmware based on the second stage boot loader, executing the ownership transfer firmware after verification, transferring ownership of the neural processing device from a first user to a second user based on the ownership setting information of the neural processing device, and encrypting or decrypting data stored in the neural processing device based on an encryption key of the second user.

20 Claims, 13 Drawing Sheets

(56) References Cited

U.S. PATENT DOCUMENTS

| | | | |
|---|---|---|---|
| 2020/0320491 A1 | 10/2020 | Hilmola et al. | |
| 2021/0103661 A1* | 4/2021 | Wu | G06F 21/572 |
| 2022/0058275 A1 | 2/2022 | Egranov et al. | |
| 2022/0129389 A1 | 4/2022 | Shiner et al. | |
| 2022/0337611 A1* | 10/2022 | Brazao | G06F 21/552 |
| 2024/0078315 A1* | 3/2024 | Chu | G06F 21/575 |
| 2024/0078316 A1* | 3/2024 | Chu | G06F 21/575 |

* cited by examiner

NEURAL PROCESSING DEVICE, NON-TRANSITORY COMPUTER-READABLE RECORDING MEDIUM AND METHOD FOR TRANSFERRING OWNERSHIP OF THE NEURAL PROCESSING DEVICE THEREOF

CROSS-REFERENCE TO RELATED APPLICATION

This application claims priority to Korean Patent Application No. 10-2024-0049299, filed in the Korean Intellectual Property Office on Apr. 12, 2024, the entire contents of which are hereby incorporated by reference.

BACKGROUND

Field

The present disclosure relates to a neural processing device and a method for transferring ownership thereof, and more specifically, to a neural processing device including a security core that executes ownership transfer firmware and transfer ownership of the neural processing device based on ownership setting information, and a method for transferring ownership thereof.

Description of Related Art

From the viewpoint of security, ownership of a neural processing device may mean an authority related to the security of the device. The initial ownership of the neural processing device generally belongs to a vendor who produces and supplies the device, and as long as a user who purchased the device simply uses the device and does not need to acquire security authority, no security issue arises due to the transfer of ownership of the device.

On the other hand, there may be times when the user who purchased the device needs to acquire the ownership in the process of using the neural processing device. For example, if the user modifies the software of the neural processing device to suit their purposes, the user needs to acquire the ownership of the device to apply the modified software to the device. As another example, if the user needs authority to access a function associated with the security of the device, such as changing settings to encrypt data associated with the computation of the neural processing device, the user needs to acquire the ownership of the device. In the above situations, the user may request the transfer of ownership of the device, and in response, the procedure for transferring the ownership of the device may be performed.

However, there is a problem that the neural processing device according to the related art may perform the ownership transfer procedure without any measures to prevent security issues, and as a result, the security issues may arise during the ownership transfer procedure of the neural processing device.

SUMMARY

In order to solve one or more problems (e.g., the problems described above and/or other problems not explicitly described herein), the present disclosure provides a neural processing device and a method for transferring ownership thereof.

The present disclosure may be implemented in a variety of ways, including methods, devices (systems) and/or computer programs stored in computer-readable storage media.

A neural processing device is provided, which may include an immutable memory configured to store ownership setting information of the neural processing device, a first non-volatile memory configured to store ownership transfer firmware, and a security core configured to execute the ownership transfer firmware and transfer ownership of the neural processing device from a first user to a second user based on the ownership setting information.

The security core may be configured to calculate a first hash value based on the ownership setting information, compare the first hash value with a second hash value stored in the ownership transfer firmware, and update the ownership setting information based on the comparison result.

The ownership setting information may include an ownership transfer nonce and an ownership transfer counter, and the security core may be configured to calculate the first hash value based on the ownership transfer nonce and the ownership transfer counter.

The ownership setting information may include owner key information, and the security core may be configured to add a public key of the second user to the owner key information if the first hash value and the second hash value are identical.

The ownership setting information may include an ownership transfer counter, and the security core may be configured to set the ownership transfer counter from a first value to a second value if the first hash value and the second hash value are identical.

The ownership setting information may further include owner key validation, and the security core may set the owner key validation from a first value to a second value if the first hash value and the second hash value are identical.

The ownership setting information may further include owner key revocation, and the security core may be configured to set the owner key revocation to a first value if the first hash value and the second hash value are identical.

The neural processing device may further include a second non-volatile memory configured to store a first stage boot loader, the immutable memory may further store a second stage boot loader, and the security core may be configured to execute the first stage boot loader, load and verify the second stage boot loader based on the first stage boot loader, execute the verified second stage boot loader, and load and verify the ownership transfer firmware based on the second stage boot loader.

The security core may be configured to decrypt an encryption code of the second stage boot loader with a public key associated with the second stage boot loader to calculate a hash value of the second stage boot loader, verify the second stage boot loader based on the calculated hash value of the second stage boot loader, and encrypt the encryption code of the second stage boot loader based on a private key associated with the second stage boot loader.

The security core may be configured to execute the recovery process if verification of the second stage boot loader fails.

The second stage boot loader may verify the ownership transfer firmware based on the ownership setting information.

The second stage boot loader may verify a signature stored in the ownership transfer firmware using a public key of the first user included in the ownership setting information, and the signature may be generated based on a private key of the first user.

The security core may be configured to, after transferring the ownership of the neural processing device from the first user to the second user, encrypt or decrypt data stored in the neural processing device based on the encryption key of the second user.

The encryption key of the second user may include a first encryption key input by the second user.

The neural processing device may further include an encryption engine configured to generate an encryption key associated with the second user in response to the transfer of the ownership of the neural processing device, and the encryption key of the second user may include a second encryption key generated by the encryption engine.

The ownership setting information may include a vendor key associated with a vendor of the neural processing device.

The second user may include the vendor, and the security core may be configured to transfer the ownership of the neural processing device from the first user to the vendor based on the vendor key.

The security core may restrict an authority of the vendor associated with the neural processing device such that the vendor has access to only a predefined portion of areas of the neural processing device.

A method for transferring ownership of a neural processing device is provided, which may be performed by a security core including one or more processors and include executing an ownership transfer firmware, calculating a first hash value based on ownership setting information of the neural processing device, comparing the first hash value with a second hash value stored in the ownership transfer firmware, and updating the ownership setting information based on the comparison result.

A non-transitory computer-readable recording medium is provided, which stores instructions for executing the method described above according to some aspects on a computer.

According to various aspects of the present disclosure, the neural processing device may include the security core that transfers ownership of the neural processing device based on the ownership setting information. As a result, security issues that may arise in the process of transferring ownership of the neural processing device can be prevented.

According to various aspects of the present disclosure, the security core may compare the first hash value calculated based on the ownership setting information with the second hash value stored in the ownership transfer firmware, and update the ownership setting information based on the comparison result. As a result, the problem that the ownership of the neural processing device is transferred by an unauthorized person can be prevented.

According to various aspects of the present disclosure, the first hash value can be calculated based on the ownership transfer nonce and the ownership transfer counter included in the ownership setting information. As a result, the problem of potential ownership theft through unauthorized ownership transfer firmware can be prevented. In addition, the problem of potential ownership theft by the previous user who does not currently have ownership can be prevented.

According to various aspects of the present disclosure, the ownership setting information may include the owner key validation for recording the ownership transfer counter of the current user. As a result, the integrity of the ownership transfer counter used during the transfer of ownership can be maintained.

According to various aspects of the present disclosure, the ownership setting information may include the owner key revocation for recording the ownership transfer counter of the previous user. As a result, the owner of the neural processing device can be restricted to the entity currently holding the ownership, and the problem of potential ownership theft by the previous user who does not currently have ownership can be prevented.

According to various aspects of the present disclosure, the security core may execute the first stage boot loader and the second stage boot loader for loading and verifying the ownership transfer firmware. Accordingly, the integrity of the ownership transfer firmware used to transfer the ownership of the neural processing device can be maintained.

According to various aspects of the present disclosure, after ownership of the neural processing device is transferred, data stored in the neural processing device can be encrypted or decrypted based on the encryption key of the user who has ownership. As a result, security issues with data that may arise due to the transfer of ownership of the neural processing device can be prevented.

According to various aspects of the present disclosure, ownership can be transferred to the vendor based on the vendor key associated with the vendor of the neural processing device, and the vendor may have limited authority such that the vendor has access to only some regions of the neural processing device. As a result, the security issue of the neural processing device that may arise in the Return Merchandise Authorization (RMA) process due to the device defect can be prevented.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

Aspects of the present disclosure will be described with reference to the accompanying drawings described below, where similar reference numerals indicate similar elements, although the aspects are not limited thereto, in which.

DETAILED DESCRIPTION

Figure 1:
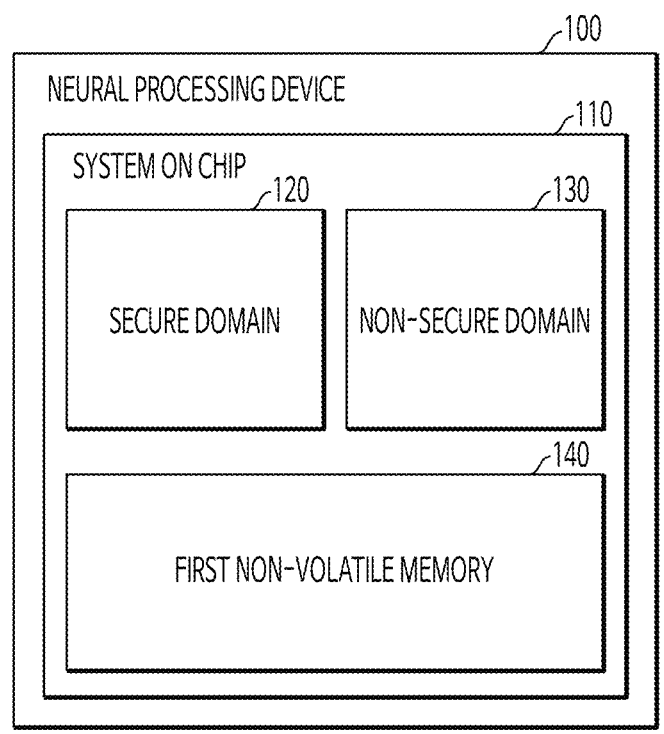
FIG. 1 is a diagram illustrating a configuration of a neural processing device according to an embodiment of the present disclosure.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same reference numerals are assigned to the same or corresponding components. In addition, in the description of the following aspects, overlapping descriptions of the same or corresponding components may be omitted. However, even if the description of the component is omitted, it is not intended that such a component is not included in any aspect.

Advantages and features of the disclosed examples and methods of accomplishing the same will be apparent by referring to examples described below in connection with the accompanying drawings. However, the present disclosure is not limited to the examples disclosed below, and may be implemented in various different forms, and the examples are merely provided to make the present disclosure complete, and to fully disclose the scope of the disclosure to those skilled in the art to which the present disclosure pertains.

The terms used herein will be briefly described prior to describing the disclosed embodiments in detail. The terms used herein have been selected as general terms that are as widely used as possible at present in consideration of the functions of the present disclosure, but they may vary according to the intent of a person skilled in the art, related case law, or the emergence of new technology. In addition, in specific cases, certain terms may be arbitrarily selected by the applicant, and the meaning of the terms will be described in detail in the description of the relevant invention. Therefore, the terms used in the present disclosure should be defined based on the meaning of the terms and the overall content of the present disclosure rather than merely by their names.

The singular forms "a," "an," and "the" as used herein are intended to include the plural forms as well, unless the context clearly specifies otherwise. Further, the plural forms are intended to include the singular forms as well, unless the context clearly specifies otherwise. Throughout the description, when a portion is stated as "comprising (including)" an element, unless explicitly stated otherwise, it means that the portion may additionally include another element, rather than excluding other elements.

The "processor" should be interpreted broadly to encompass a general-purpose processor, a central processing unit (CPU), a microprocessor, a digital signal processor (DSP), a controller, a microcontroller, a state machine, etc. Under some circumstances, the "processor" may refer to an Application-Specific Integrated Circuit (ASIC), a Programmable Logic Device (PLD), a Field-Programmable Gate Array (FPGA), etc. The "processor" may refer to a combination of processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as Random Access Memory (RAM), Read-Only Memory (ROM), Non-Volatile Random Access Memory (NVRAM), Programmable Read-Only Memory (PROM), Erasable Programmable Read-Only Memory (EPROM), Electrically Erasable PROM (EEPROM), flash memory, magnetic or marking data storage, or registers. The memory is said to be in electronic communication with the processor if the processor can read and/or write information from and/or to the memory. The memory integrated with the processor is in electronic communication with the processor.

In addition, terms such as first, second, A, B, (a), (b) used in the following examples are only used to distinguish certain components from other components, and the nature, sequence, order, etc. of the corresponding components are not limited by these terms.

In addition, in the following description, if one component is described to be "connected," "coupled," or "attached" to another component, it should be understood that the component may be directly connected to or in contact with the other component, but another component may also be interposed between them while still being "connected," "coupled," or "attached."

In addition, the words "comprises" and/or "comprising" as used in the following embodiments mean that the components, steps, operations, and/or elements mentioned do not exclude the presence or addition of one or more other components, steps, operations, and/or elements.

In addition, in the following examples, "each of a plurality of A's" may refer to each of all components included in the plurality of A's, or may refer to each of some of the components included in the plurality of A's.

In the present disclosure, a "neural processing device" may refer to a device that performs computations using a machine learning model, for example, an artificial neural network. For example, the "neural processing device" may be a device specialized for performing deep learning computational tasks.

In the present disclosure, the "ownership" may refer to functional authority as well as legal rights. For example, the "ownership" of the neural processing device may refer to authority over a security key used for tasks associated with the security of the neural processing device, such as secure booting, secure firmware update, and data encryption.

In the present disclosure, the "non-volatile memory" may refer to a memory that continuously retains stored information even when there is no power supply. For example, the non-volatile memory 140 may include at least one of a Read-Only Memory (ROM), a Programmable Read-Only Memory (PROM), an Erasable Alterable ROM (EAROM), an Erasable Programmable Read-Only Memory (EPROM), an Electrically Erasable Programmable Read-Only Memory (EEPROM) (e.g., a NAND flash memory, a NOR flash memory, etc.), an Ultra-Violet Erasable Programmable Read-Only Memory (UVEPROM), a Ferroelectric Random Access Memory (FeRAM), a Magnetoresistive Random Access Memory (MRAM), a Phase-change Random Access Memory (PRAM), a Silicon-Oxide-Nitride-Oxide-Silicon (SONOS) memory, a Resistive Random Access Memory (RRAM), a Nanotube Random Access Memory (NRAM), a magnetic computer storage device (e.g., a hard disk, a diskette drive, a magnetic tape, etc.), an optical disk drive, or 3D XPoint memory. However, the present disclosure is not limited to the above.

In the present disclosure, the "volatile memory" may refer to a memory that continuously requires power to maintain stored information. For example, the "volatile memory" may include at least one of Dynamic Random Access Memory (DRAM), Static Random Access Memory (SRAM), Synchronous Dynamic Random Access Memory (SDRAM), and Double Data Rate SDRAM (DDR SDRAM). However, the present disclosure is not limited to the above.

FIG. 1 is a diagram illustrating a configuration of a neural processing device 100 according to an embodiment of the present disclosure. The neural processing device 100 may include a system on chip (SOC) 110 and a first non-volatile memory 140, as illustrated in FIG. 1.

The SOC 110 may be an integrated circuit that integrates all system elements in a single chip. The SOC 110 may be a neural core system on chip that executes an artificial neural network and accelerates tasks associated with the artificial neural network. The SOC 110 may include a secure domain 120 that includes a configuration for performing, managing, or distributing computational tasks for security purposes and a non-secure domain 130 that includes a configuration for performing, managing, or distributing general computational tasks other than the security purposes. Details of each domain will be described below with reference to FIGS. 2 to 4.

The first non-volatile memory 140 may store firmware associated with a computational task of the SOC 110. The first non-volatile memory 140 may store a firmware image of the secure domain 120. For example, the first non-volatile memory 140 may store ownership transfer firmware used for ownership transfer tasks of the neural processing device 100. Furthermore, the first non-volatile memory 140 may store a firmware image of the non-secure domain 130. For example, the first non-volatile memory 140 may store a firmware image for an artificial neural network computational task.

In FIG. 1, the components of the neural processing device 100 represent functionally classified functional elements, and a plurality of components may be implemented in an integrated form in actual physical environment. Alternatively, the components of the neural processing device 100 may be implemented separately from each other in the actual physical environment. In addition, the internal configuration of the neural processing device 100 is not limited to FIG. 1, and some configurations may be omitted or other configurations may be added.

Figure 2:
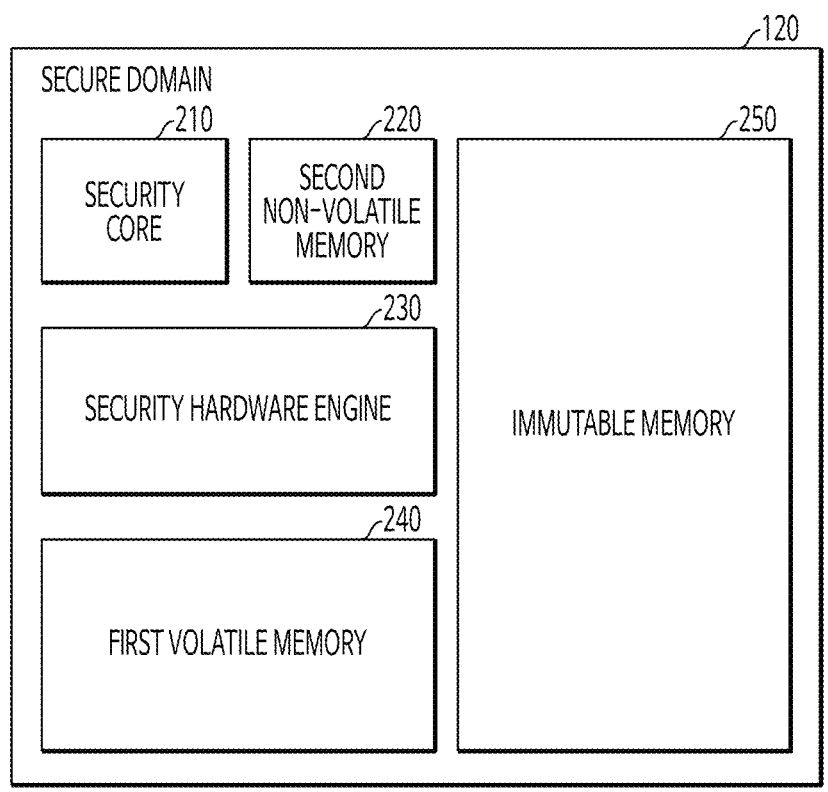
FIG. 2 is a diagram illustrating a configuration of the secure domain according to an embodiment of the present disclosure.

FIG. 2 is a diagram illustrating a configuration of the secure domain 120 according to an embodiment of the present disclosure. The secure domain 120 may include a configuration for performing, managing, and/or distributing computational tasks for security purposes. Since the secure domain 120 is a region where security-related tasks are performed, configurations within and outside the system, except for those included in the secure domain 120, may access the secure domain 120 only for limited purposes, such as sending a request to access encrypted data, and access to the secure domain 120 may be restricted for any other purposes. The secure domain 120 may include a security core 210, a second non-volatile memory 220, a security hardware engine 230, a first volatile memory 240, and an immutable memory 250, as illustrated in FIG. 2.

The security core 210 may be a core that performs computational tasks for security purposes. Additionally or alternatively, the security core 210 may be a core that manages cores performing computational tasks for security purposes or that distributes tasks. For example, the security core 210 may perform encryption/decryption of data, integrity verification of data, access control of data, and transfer of ownership of a neural processing device. Additionally, the security core 210 may have the highest priority among the cores of the neural processing device (e.g., the neural processing device 100 of FIG. 1), because the operation of all systems except for the security core 210 must be stopped in the event of a security-related issue. In such a configuration, the security core 210 may have access to all components of the neural processing device. With the configuration described above, security issues that may arise during the process of transferring ownership of the neural processing device can be prevented.

The second non-volatile memory 220 may be an internal memory that stores code associated with task computations for security purposes performed by the security core 210. The security core 210 may load the code stored in the second non-volatile memory 220 and perform security-related computational tasks through the loaded code. For example, the second non-volatile memory 220 may store a first stage boot loader, and the security core 210 may initiate a secure booting task by loading and executing the first stage boot loader stored in the second non-volatile memory 220.

The security hardware engine 230 may include dedicated hardware for accelerating security-related computational tasks. For example, the security hardware engine 230 may include at least one of an encryption key manager that manages encryption keys associated with encryption computation and/or decryption computation performed by the security core 210, an encryption engine that generates encryption keys associated with encryption computation and/or decryption computation, a hash engine that assists in the generation of a hash value for the security core 210, and a crypto accelerator that assists in cryptographic computation for the security core 210. However, the present embodiment is not limited to the above.

The first volatile memory 240 may be an internal memory for the security core 210 to load code associated with security-related computational tasks. The security core 210 may load into the first volatile memory 240 code associated with security-related computational tasks from at least one of the second non-volatile memory 220, the immutable memory 250, and an external memory (e.g., the first non-volatile memory 140 of FIG. 1), and execute the loaded code to perform security-related computational tasks. For example, the security core 210 may load ownership transfer firmware from the external memory to perform the ownership transfer task for the neural processing device.

The immutable memory 250 may be a memory that stores unalterable data and/or software. Accordingly, the integrity of data and/or software stored in the immutable memory 250 may be guaranteed. Integrity may refer to the characteristic of maintaining the initially stored content without alteration. In this case, the immutable memory 250 may be either tamper-proof Read-Only Memory (ROM) or One-Time Programmable (OTP) memory, but is not limited to these.

In FIG. 2, the components of the secure domain 120 represent functionally classified functional elements, and a plurality of components may be implemented in an integrated form in the actual physical environment. Alternatively, the components of the secure domain 120 may be implemented separately from each other in the actual physical environment. In addition, the internal configuration of the secure domain 120 is not limited by FIG. 2, and some configurations may be omitted or other configurations may be added.

Figure 3:
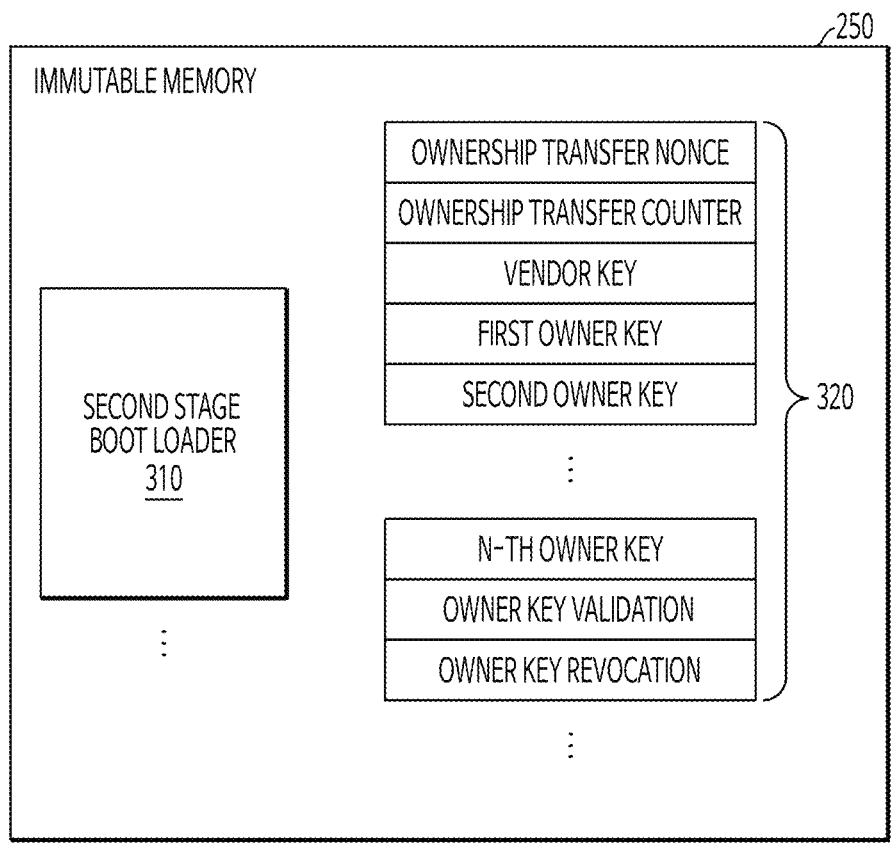
FIG. 3 is a diagram illustrating data stored in the immutable memory according to an embodiment of the present disclosure.

FIG. 3 is a diagram illustrating data stored in the immutable memory 250 according to an embodiment of the present disclosure. The immutable memory 250 may store data and/or software for performing the ownership transfer task of the neural processing device (e.g., the neural processing device 100 of FIG. 1) by the security core (e.g., the security core 210 of FIG. 2).

The immutable memory 250 may store a second stage boot loader. The second stage boot loader stored in the immutable memory 250 may be loaded and executed by the security core. The security core may check a valid key for verifying the next stage boot loader through the second stage boot loader and load and verify the ownership transfer firmware stored in an external memory.

The immutable memory 250 may store ownership setting information 320. The security core may perform the ownership transfer task for the neural processing device based on the ownership setting information 320 stored in the immutable memory 250. The ownership setting information 320 may include an ownership transfer nonce, an ownership transfer counter, a vendor key, owner key information (e.g., first owner key, second owner key, third owner key, N-th owner key), owner key validation, and owner key revocation.

The ownership transfer nonce may be unique data allocated to the neural processing device. For example, the ownership transfer nonce may be a random value allocated during a provisioning stage during the life cycle of the neural processing device. The ownership transfer nonce may be used to calculate a hash value for verifying the user's authority in the ownership transfer task of the neural processing device. The ownership transfer nonce may be designed not to be exposed to the outside for security, and if requested by a user who has ownership of the neural processing device, only the hash value to verify the user's authority may be exposed to the outside.

The ownership transfer counter may be data associated with the number of times the ownership transfer task is performed. For example, if the ownership transfer task is performed, the ownership transfer counter may increase. The ownership transfer counter may be used to calculate a hash value for verifying the user's authority in the ownership transfer task. In addition, the ownership transfer counter may be used to indicate the owner key of the user who has the ownership of the neural processing device. Like the ownership transfer nonce, the ownership transfer counter may be designed not to be exposed to the outside for security, and if requested by a user who has ownership of the neural processing device, only the hash value to verify the user's authority may be exposed to the outside.

The vendor key may be data associated with a vendor of the neural processing device. For example, the vendor key may be a public key of a vendor that generates and/or supplies the neural processing device, and may be set during the provisioning stage of the neural processing device. The vendor key may be used to transfer the ownership of the neural processing device to the vendor.

The owner key information may be a security key of a previous and/or current user of the neural processing device. For example, the owner key information may include a public key of the previous and/or current user of the neural processing device. The owner key information may be in such a form that the public keys of the previous and/or current user of the neural processing device are stored in chronological order according to the characteristics of the immutable memory.

The owner key validation may be data for indicating the current user who has the ownership of the neural processing device. To this end, the owner key validation may be equal to the current value of the ownership transfer counter. As a result, the integrity of the ownership transfer counter used during a transfer of ownership can be maintained.

The owner key revocation may be data used to ensure that only one user holds ownership of the neural processing device. To this end, the owner key revocation may be the same as the ownership transfer counter of the user who most recently transferred the ownership of the neural processing device. As a result, the issue of ownership being hijacked by a previous user who no longer has ownership can be prevented.

FIG. 3 illustrates the data and/or software stored in the immutable memory 250, but aspects are not limited thereto, and the immutable memory 250 may omit some data and/or software illustrated in FIG. 3, or may additionally store other tamper-proof data and/or software.

Figure 4:
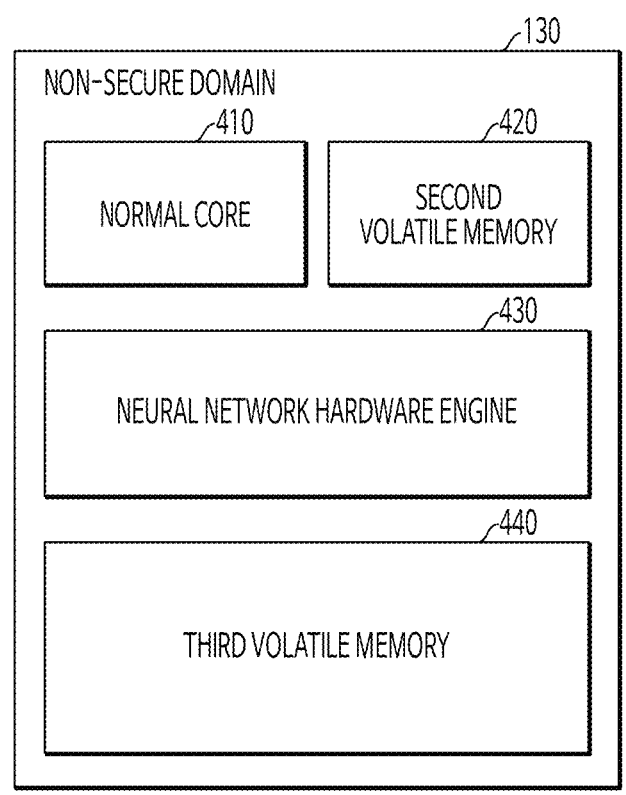
FIG. 4 is a diagram illustrating a configuration of the non-secure domain according to an embodiment of the present disclosure.

FIG. 4 is a diagram illustrating a configuration of the non-secure domain 130 according to an embodiment of the present disclosure. The non-secure domain 130 may include a configuration for performing, managing, or distributing general computational tasks unrelated to security. The non-secure domain 130 may include a normal core 410, a second volatile memory 420, a security hardware engine 430, and a third volatile memory 440, as illustrated in FIG. 4.

The normal core 410 may be a core that performs computational tasks unrelated to security. Additionally or alternatively, the normal core 410 may be a core that manages cores performing computational tasks unrelated to security or that distributes such tasks. For example, the normal core 410 may load normal firmware code stored in an external memory (e.g., the first non-volatile memory 140 of FIG. 1) and process (e.g., compute) or drive the data.

The neural network hardware engine 430 may include dedicated hardware for accelerating computational tasks related to artificial neural networks. For example, the neural network hardware engine 430 may include a neural processing unit (NPU) specialized for artificial neural networks that recognize and process complex patterns in large datasets.

The second volatile memory 420 and the third volatile memory 440 may be internal memories for the normal core 410 to load code associated with computational tasks unrelated to security. The normal core 410 may perform such computational tasks by loading code associated with them from an external memory (e.g., the first non-volatile memory 140 of FIG. 1) into at least one of the second volatile memory 420 and the third volatile memory 440 and executing it. For example, the normal core 410 may process data by loading normal firmware code from the external memory into at least one of the second volatile memory 420 and/or the third volatile memory 440 and executing it.

In FIG. 4, the components of the non-secure domain 130 represent functionally classified functional elements, and a plurality of components may be implemented in an integrated form in the actual physical environment. Alternatively, the components of the non-secure domain 130 may be implemented separately from each other in the actual physical environment. In addition, the internal configuration of the non-secure domain 130 is not limited by FIG. 4, and some configurations may be omitted or other configurations may be added.

Figure 5:
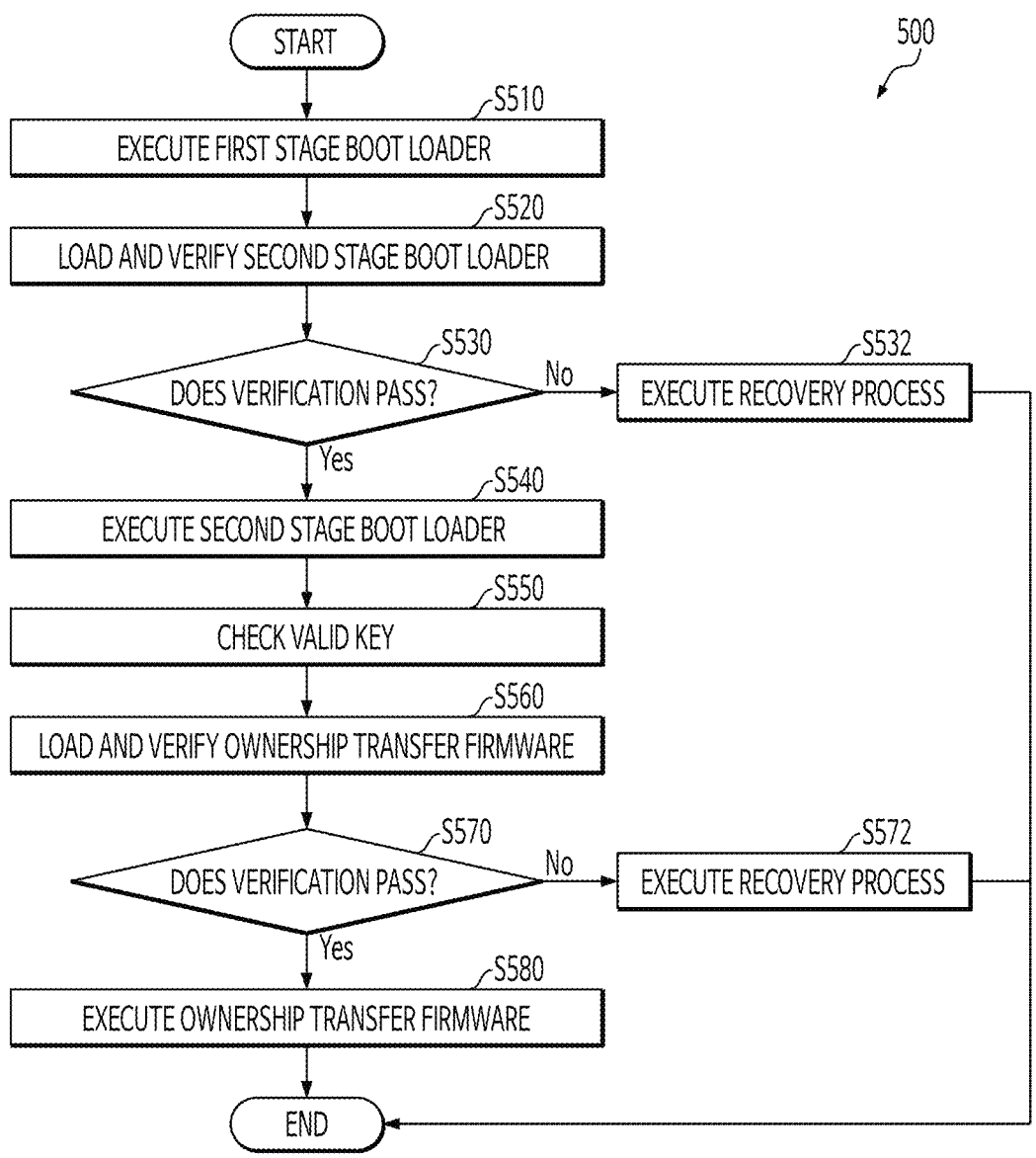
FIG. 5 is a flowchart illustrating an example of a secure booting process for executing ownership transfer firmware.

FIG. 5 is a flowchart illustrating an example of a secure booting process 500 for executing ownership transfer firmware. The secure booting process 500 may be performed by the security core (e.g., the security core 210 of FIG. 2). The secure booting process 500 may be initiated by executing the first stage boot loader, at S510. The first stage boot loader may be software stored in an internal memory (e.g., the second non-volatile memory 220 of FIG. 2) of the security domain.

The security core may load and verify the second stage boot loader, at S520. The second stage boot loader may be software stored in the immutable memory (e.g., the immutable memory 250 of FIG. 2) of the security domain. In addition, the security core may decrypt an encryption code of the second stage boot loader with a public key associated with the second stage boot loader to calculate a hash value of the second stage boot loader, and verify the second stage boot loader based on the calculated hash value of the second stage boot loader. In this case, the encryption code of the second stage boot loader may be encrypted based on a private key associated with the second stage boot loader.

The security core may determine whether the second stage boot loader passes verification, at S530. If the second stage boot loader fails to pass verification, the security core may execute the recovery process, at S532. This will be described in detail elsewhere below with reference to FIG. 7. On the other hand, if the second stage boot loader passes verification, the security core may execute the second stage boot loader, at S540.

The security core may check the valid key for verification of the next stage boot loader (e.g., the third stage boot loader, etc.) through the second stage boot loader, at S550. For example, the security core may check a public key for decrypting an encryption code of the third stage boot loader.

The security core may load and verify the ownership transfer firmware, at S560. The security core may load and verify the ownership transfer firmware stored in an external memory (e.g., the first non-volatile memory 140 of FIG. 1). In addition, the security core may verify a signature stored in the ownership transfer firmware using a public key of a first user included in the ownership setting information through the second stage boot loader. In this case, the signature may be generated based on a private key of the first user.

The security core may determine whether the ownership transfer firmware passes verification, at S570. If the ownership transfer firmware fails to pass verification, the security core may execute the recovery process, at S572. This will be described in detail below with reference to FIG. 7. On the other hand, if the ownership transfer firmware passes verification, the security core may execute the ownership transfer firmware, at S580. Through the process described above, the integrity of the ownership transfer firmware used to transfer the ownership of the neural processing device can be maintained.

The flowchart illustrated in FIG. 5 and the above description are merely examples, and different aspects may be implemented. For example, in some aspects, the order of respective operations may be changed, some of the operations may be repeatedly performed, some may be omitted, or some may be added.

Figure 6:
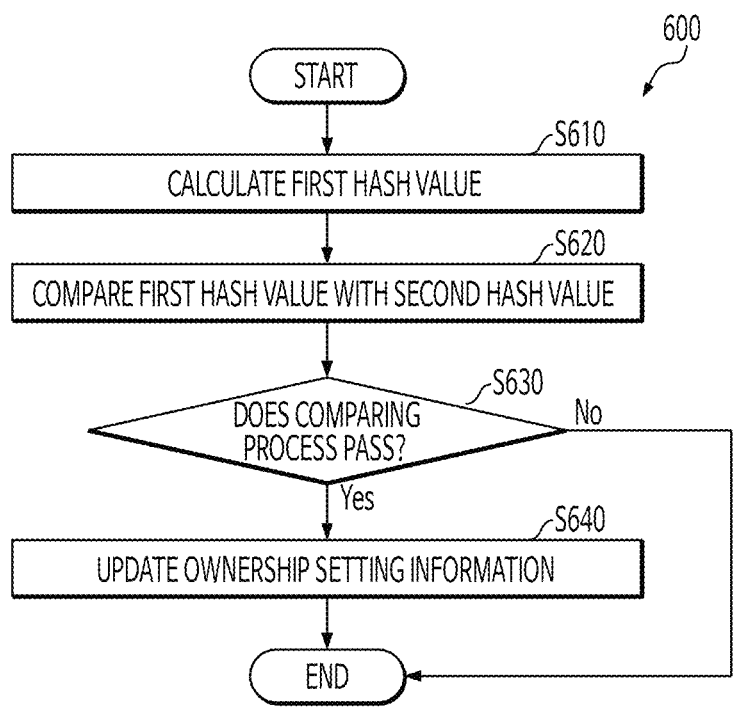
FIG. 6 is a flowchart illustrating an example of an ownership transfer process.

FIG. 6 is a flowchart illustrating an example of an ownership transfer process 600. The ownership transfer process 600 may be performed after the secure booting process 500 illustrated in FIG. 5 is performed. In addition, the ownership transfer process 600 may be performed by the security core (e.g., the security core 210 of FIG. 2).

The ownership transfer process 600 may be initiated by calculating a first hash value, at S610. The security core may calculate the first hash value based on the ownership setting information stored in the immutable memory. In addition, the security core may calculate the first hash value using the security hardware engine.

The security core may compare the calculated first hash value with a second hash value, at S620. The second hash value may be a hash value stored in the ownership transfer firmware.

The security core may determine whether the comparison process of the first hash value and the second hash value passes, at S630. If the first hash value and the second hash value are identical and thus pass the comparison process, the security core may update the ownership setting information of the neural processing device, at S640. As a result, the ownership of the neural processing device may be transferred from the first user to a second user. On the other hand, if the first hash value and the second hash value are different from each other and fail to pass the comparison process, the security core may terminate the ownership transfer process 600 without updating the ownership setting information of the neural processing device. Through the ownership transfer process 600 described above, the problem of transfer of the ownership of the neural processing device by an unauthorized person can be prevented.

The flowchart illustrated in FIG. 6 and the above description are merely examples, and in some embodiments, different implementations may be possible. For example, in some embodiments, the order of certain operations may be changed, some operations may be repeatedly performed, some may be omitted, or some may be added.

Figure 7:
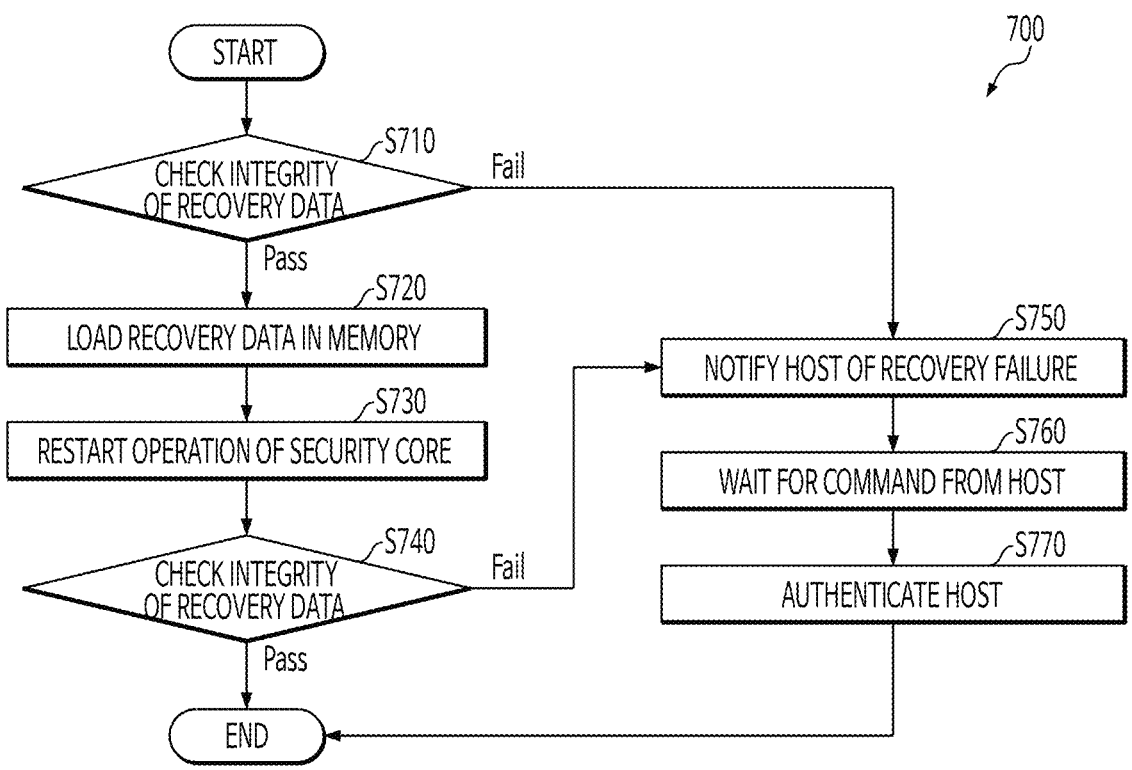
FIG. 7 is a flowchart illustrating an example of a recovery process.

FIG. 7 is a flowchart illustrating an example of a recovery process 700. The recovery process 700 may be performed if verification fails in the secure booting process 500 illustrated in FIG. 5. In addition, the recovery process 700 may be performed by the security core (e.g., the security core 210 of FIG. 2).

First, the security core may check the integrity of the recovery data, at S710. For example, the security core may determine whether the recovery data has been tampered with based on trusted recovery data (e.g., firmware, page table, etc.) stored separately in the non-volatile memory accessible by the security core and the encrypted value (e.g., hash value) stored in association with the recovery data.

If it is determined as a result of performing S710 that the recovery data has not been tampered with, the security core may load the recovery data in the memory (e.g., the first volatile memory 240 of FIG. 1) in the secure domain, at S720, and restart the operation of the security core, at S730. For example, the security core may perform secure booting of the security core again by loading the recovery data into the first volatile memory.

After the restart, the security core may check the integrity of the recovery data again, at S740. The security core may perform the integrity checks temporarily, periodically, aperiodically, and/or for a predetermined period of time. If no abnormality is found as a result of the integrity check, the recovery process may end.

Alternatively, during the integrity check process, if it is determined that at least part of the data loaded into the memory in the secure domain has been tampered with, the security core may use an interrupt to notify the host of the failure of the recovery, at S750, and wait for a command from the host, at S760.

If the security core detects access from the host to the system while waiting to receive a command from the host, it may perform authentication of the host access to the system, based on the assumption that the host may have been maliciously attacked, at S770. For example, the authentication process may be performed using an encryption key associated with the host, which is managed by the encryption key manager. In addition, for confidentiality, the authentication may be performed using a bi-directional encryption algorithm (e.g., symmetric key encryption algorithms such as AES and SEED or asymmetric key encryption algorithms such as RSA and DSA).

The flowchart illustrated in FIG. 7 and the above description are merely examples, and in some embodiments, different implementations may be possible. For example, in some embodiments, the order of certain operations may be changed, some operations may be repeatedly performed, some may be omitted, or some may be added.

Figure 8:
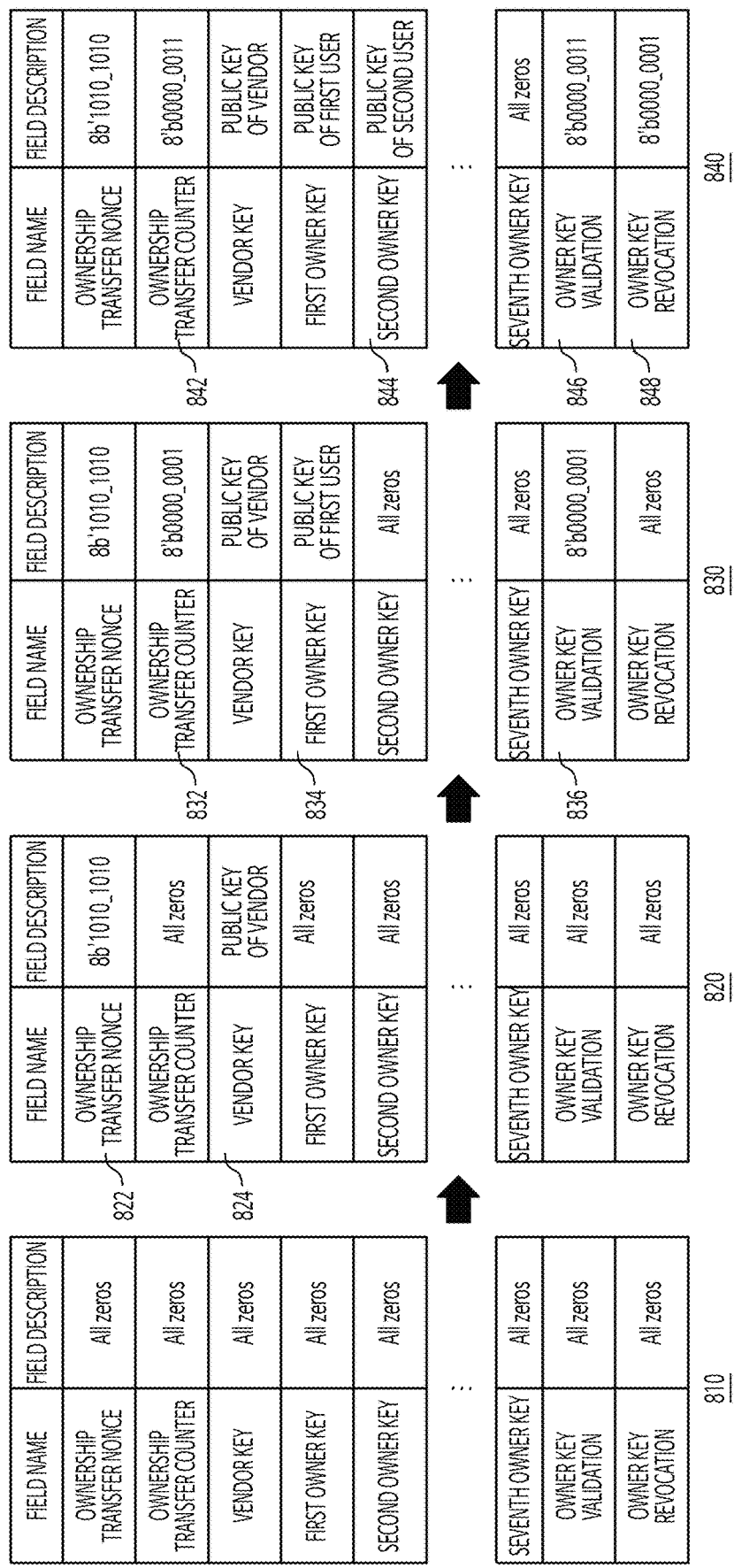
FIG. 8 is a diagram illustrating an example of updating ownership setting information according to a life cycle of the neural processing device.

FIG. 8 is a diagram illustrating an example of updating the ownership setting information according to the life cycle of the neural processing device. The life cycle of the neural processing device may include an initial stage, a provisioning stage, a primary ownership transfer stage, and a secondary ownership transfer stage, and the ownership setting information may be updated according to each stage. In addition, the ownership setting information may be data stored in the immutable memory (e.g., the immutable memory 250 of FIG. 2, etc.), and may include an ownership transfer nonce, an ownership transfer counter, a vendor key, owner key information, owner key validation, and owner key revocation.

A first data table 810 represents the ownership setting information at the initial stage during the life cycle of the neural processing device. The initial stage may refer to a stage when the neural processing device has completed manufacturing. In the initial stage, the ownership setting information may be in a blank state. For example, the ownership transfer nonce, the ownership transfer counter, the vendor key, the owner key information, the owner key validation, and the owner key revocation included in the ownership setting information may all be zero. Alternatively, the ownership transfer nonce, the ownership transfer counter, the vendor key, the owner key information, the owner key validation, and the owner key revocation included in the ownership setting information may all be in a null state with no value input.

A second data table 820 represents the ownership setting information in the provisioning stage during the life cycle of the neural processing device. The provisioning stage may refer to a stage when the vendor first acquires the ownership of the neural processing device, and the ownership setting information is updated by the vendor before the neural processing device is distributed. In the provisioning stage, at least a part of the ownership setting information may be updated. For example, an ownership transfer nonce 822 may be set to "8'b1010_1010", which is an 8-bit random value. In addition, a vendor key 824 included in the ownership setting information may be set to a public key of the vendor.

A third data table 830 represents the ownership setting information in the primary ownership transfer stage during the life cycle of the neural processing device. The primary ownership transfer stage may refer to a stage when the ownership of the neural processing device is transferred from the vendor to the first user. In the stage of transferring the primary ownership, at least a part of the ownership setting information may be updated. For example, an ownership transfer counter 832 included in the ownership setting information may be set to an 8-bit "8'b0000_0001", which is a new value. A first owner key 834 of the owner key information included in the ownership setting information may be set to the public key of the first user. In addition, owner key validation 836 included in the ownership setting information may be set to an 8-bit "8'b0000_0001", which is the same value as the ownership transfer counter 832.

A fourth data table 840 represents the ownership setting information in the secondary ownership transfer stage during the life cycle of the neural processing device. The secondary ownership transfer stage may refer to a stage when the ownership of the neural processing device is transferred from the first user to the second user. In the secondary ownership transfer stage, at least a part of the ownership setting information may be updated. For example, an ownership transfer counter 842 included in the ownership setting information may be set from "8'b0000_0001" to "8'b0000_0011". In this case, the newly set ownership transfer counter 842 may be "8'b0000_0011" rather than "8'b0000 0010" due to the characteristics of the immutable memory, which does not allow converting 1 to 0. A second owner key 844 of the owner key information included in the ownership setting information may be set to the public key of the second user. Owner key validation 846 included in the ownership setting information may be set to an 8-bit "8'b0000_0011", which is the same value as the ownership transfer counter 842. In addition, owner key revocation 848 included in the ownership setting information may be set to the previous ownership transfer counter, "8'b0000 0001".

The field names and data of the data tables 810 to 840 illustrated in FIG. 8 are only examples, and may be implemented differently in some aspects. For example, the field names or data may be changed, some fields may be omitted, or new fields may be added.

Figure 9:
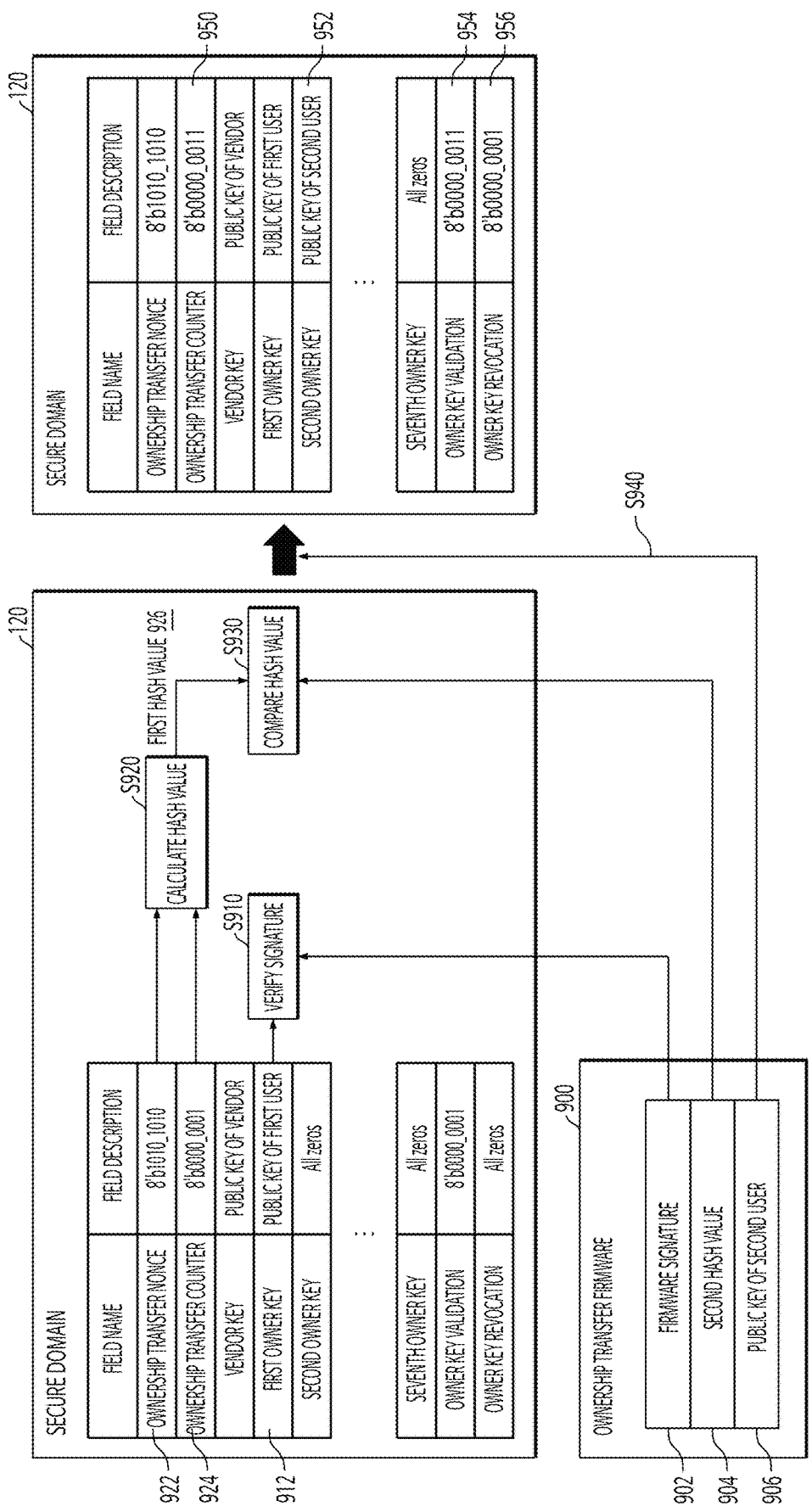
FIG. 9 is a diagram illustrating an example in which a security core transfers ownership of the neural processing device from a first user to a second user.

FIG. 9 is a diagram illustrating an example in which the security core transfers ownership of the neural processing device from the first user to the second user. The security core (e.g., the security core 210 of FIG. 2, etc.) may initiate the ownership transfer task of the neural processing device through ownership transfer firmware 900. The ownership transfer task may be performed within the secure domain 120. In addition, the ownership transfer firmware 900 may be firmware stored in the external memory (e.g., the first non-volatile memory 140 of FIG. 1, etc.).

Before executing the ownership transfer firmware 900, the security core may verify a signature of the ownership transfer firmware 900 through the second stage boot loader, at S910. The second stage boot loader may be software capable of verifying the ownership transfer firmware 900 based on the ownership setting information. For example, the second stage boot loader may verify a firmware signature 902 stored in the ownership transfer firmware using the public key of the first user, which is a first owner key 912, included in the ownership setting information. In this case, the firmware signature 902 may be a digital signature generated using the private key of the first user. If the ownership transfer firmware 900 is verified, the security core may execute the ownership transfer firmware 900.

The security core may calculate a first hash value 926 based on the ownership setting information, at S920. The security core may apply a hash function to an ownership transfer nonce 922 and an ownership transfer counter 924 to calculate the first hash value 926. In this case, the hash function may include at least one of Message Digest Algorithm 5 (MD5), Secure Hash Algorithm 1 (SHA-1), SHA-256, SHA-3, bcrypt, and Argon2. However, aspects are not limited to the above.

The security core may compare the first hash value with a second hash value 904 stored in the ownership transfer firmware 900, at S930. The second hash value 904 may be a hash value calculated by applying a hash function to the ownership transfer nonce and the ownership transfer counter at the time when the ownership is transferred to the first user.

In addition, the hash function used to calculate the second hash value 904 may be the same as the hash function used to calculate the first hash value 926.

As a result of the comparison, if the first hash value 926 and the second hash value 904 are identical, the security core may update the ownership setting information, at S940. The security core may set an ownership transfer counter 950 to "8'b0000_0011" according to the characteristics of the immutable memory. The security core may set a second owner key 952 of the owner key information to the public key 906 of the second user stored in the ownership transfer firmware 900. In addition, the security core may set owner key validation 954 to "8'b0000_0011," which is the ownership transfer counter of the second user, and set owner key revocation 956 to "8'b0000_0001," which is the ownership transfer counter of the first user.

With the configuration described above, the problem of transfer of the ownership of the neural processing device by an unauthorized person such as a previous user who does not currently have ownership can be prevented.

Figure 10:
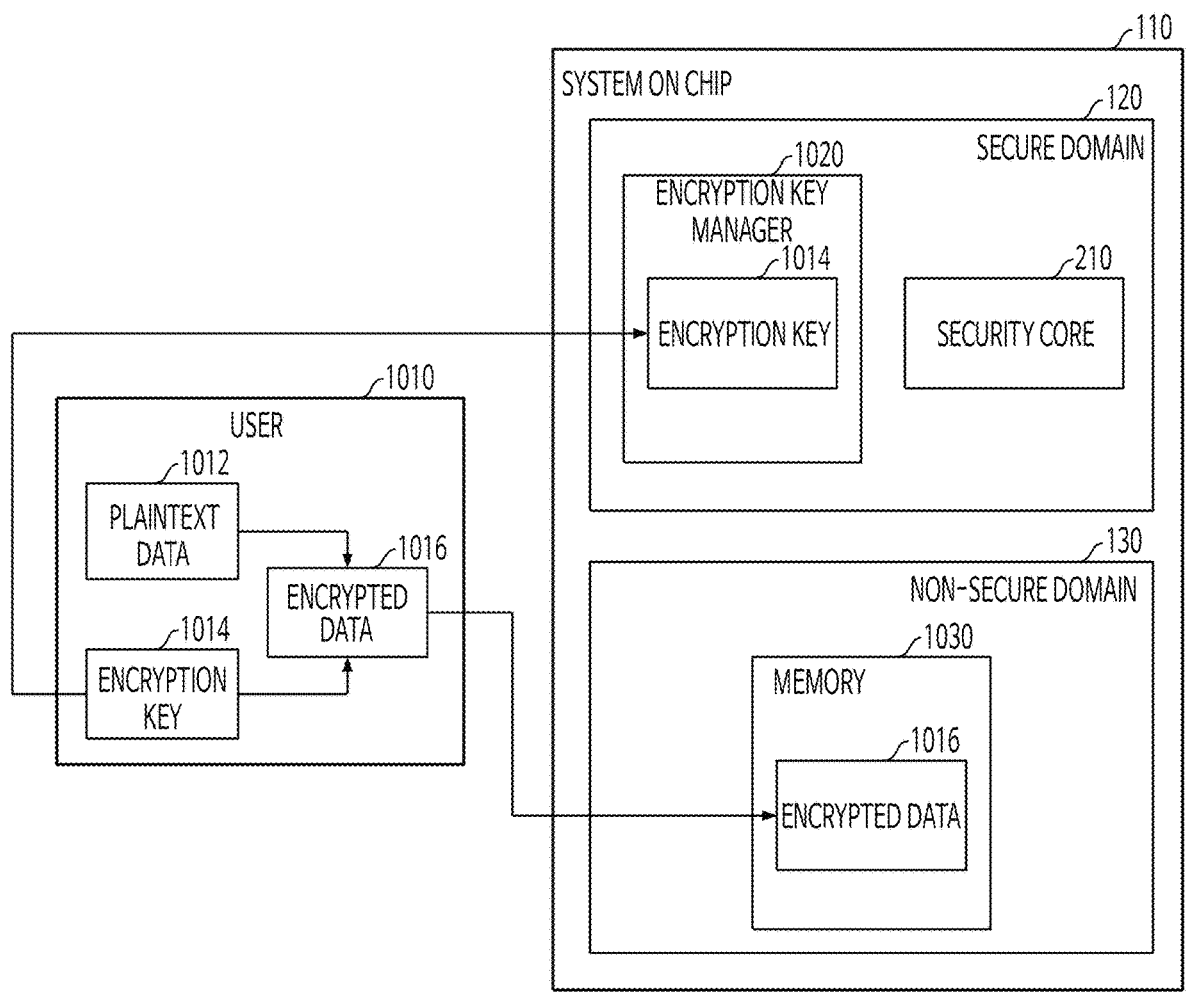
FIGS. 10 and 11 are diagrams illustrating a confidential computing method according to various embodiments.
Figure 11:
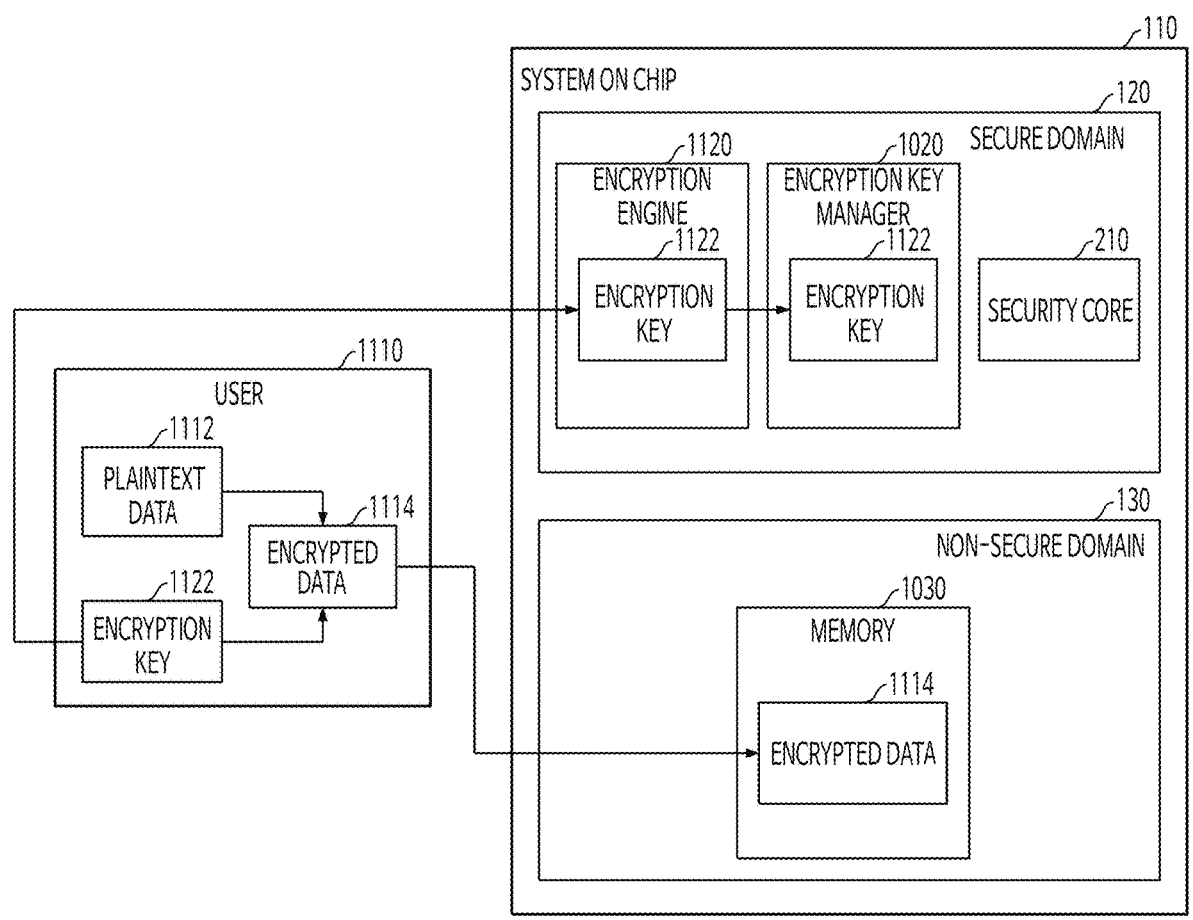

FIGS. 10 and 11 are diagrams illustrating a confidential computing method according to various embodiments. When transmitting data to a device associated with a user 1010 or 1110, the SOC 110 of the neural processing system may perform encryption on the data before transmitting the data to maintain data confidentiality. Likewise, when a device associated with a user 1010 or 1110 transmits data to the SOC 110 of the neural processing system, the device may perform encryption on the data before transmission. To this end, a separate security channel may be generated in advance between the SOC 110 and the device associated with a user 1010 or 1110, and the security core 210 may transmit and/or receive an encryption key to/from the device associated with a user 1010 or 1110 using an encryption key exchange algorithm (e.g., the ECDH algorithm) through the separate security channel. The encryption key information used to perform encryption and/or decryption within the SOC 110 may be managed by an encryption key manager 1020 in the secure domain 120.

The security core 210 may perform encryption and decryption using a bidirectional encryption algorithm to maintain the confidentiality of the data of the user. For example, any bidirectional encryption algorithm known in the art, such as a symmetric key encryption algorithm such as AES or SEED or an asymmetric key encryption algorithm such as RSA or DSA, may be used. However, for convenience of explanation, aspects will be described below based on the assumption that the security core 210 maintains the confidentiality of data by using a symmetric key encryption algorithm.

The device associated with the users 1010 and 1110 may generate encrypted data 1016 and 1114 by performing encryption on plaintext data 1012 and 1112 using encryption keys 1014 and 1122. The plaintext data 1012 and 1112 may refer to decrypted data in the form of plaintext.

The device associated with the users 1010 and 1110 may transmit the generated encrypted data 1016 and 1114 to the SOC 110. The SOC 110 may store the encrypted data 1016 and 1114 received from the device associated with the users 1010 and 1110 in a memory 1030 (e.g., the second volatile memory 420 of FIG. 4 and the third volatile memory 440 of FIG. 4) in the non-secure domain 130 in its encrypted form without decrypting the same.

As described above, by storing the encrypted data received from the device associated with the users 1010 and 1110 in the memory 1030 in the encrypted form rather than decrypting and storing it in the memory 1030 in the plaintext form, the SOC 110 may maintain the confidentiality of the data. Conversely, when using the encrypted data 1016 stored in the memory 1030, the security core 210 may perform decryption using the encryption keys 1014 and 1122 stored in the encryption key manager 1020.

In FIG. 10, the encryption key 1014 used to encrypt the plaintext data 1012 may be provided to the secure domain 120 from the device associated with the user 1010. For example, the user 1010 may encrypt the plaintext data 1012 using their public key. The user 1010 may transmit the encryption key 1014 through a separate security channel, and the encryption key manager 1020 may store and manage the transmitted encryption key 1014.

In FIG. 11, an encryption key 1122 used to encrypt plaintext data 1112 may be generated by the SOC 110. For example, the SOC 110 may include an encryption engine 1120 in the secure domain 120. In response to the transfer of the ownership of the neural processing device, the encryption engine 1120 may generate the encryption key 1122 associated with the user 1110 to whom the ownership has been transferred.

The encryption engine 1120 may transmit the generated encryption key 1122 to an encryption key manager 1130 and the user 1110 through an internal security channel and/or a separate security channel. The user 1110 may encrypt the plaintext data 1112 based on the received encryption key 1122.

As in the configuration described above, after ownership of the neural processing device is transferred, data stored in the neural processing device may be encrypted or decrypted based on the encryption key of the user 1010 or 1110 who has ownership. As a result, security issues with data that may arise due to the transfer of ownership can be prevented.

Figure 12:
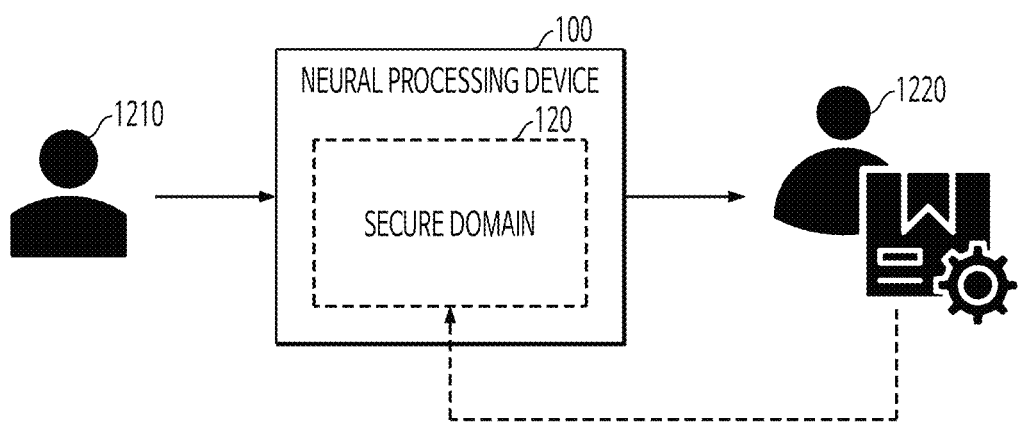
FIG. 12 is a diagram illustrating an example in which the ownership of the neural processing device is transferred from a user to a vendor.

FIG. 12 is a diagram illustrating an example in which the ownership of the neural processing device 100 is transferred from a user 1210 to a vendor 1220. If the operation of the neural processing device 100 by the vendor 1220 is required, a situation may arise where the user 1210 needs to transfer the ownership of the neural processing device 100 to the vendor 1220. For example, if a defect occurs in the neural processing device 100, in order to resolve the defect, the neural processing device 100 may be operated by the vendor.

In this case, the security core of the neural processing device 100 may transfer the ownership of the neural processing device 100 from the user 1210 to the vendor 1220 based on the vendor key included in the ownership setting information. For example, the security core may transfer ownership to the vendor 1220 by determining whether the vendor key included in the ownership setting information is identical to a key held by the vendor 1220. Alternatively, the vendor key may be the public key of the vendor, and the security core may transfer ownership to the vendor 1220 by determining whether the signature held by the vendor 1220 is verified by the vendor key.

In addition, in this case, the security core may restrict the authority associated with the neural processing device 100 so that the vendor 1220 to whom the ownership has been transferred may have access to only some predefined regions of the neural processing device 100. For example, to prevent data leakage by the vendor 1220, the security core may restrict the authority of the vendor so that the vendor may not access the secure domain 120 of the neural processing device 100.

With the configuration described above, security issue that may arise in the Return Merchandise Authorization (RMA) process due to the device defect can be prevented.

Figure 13:
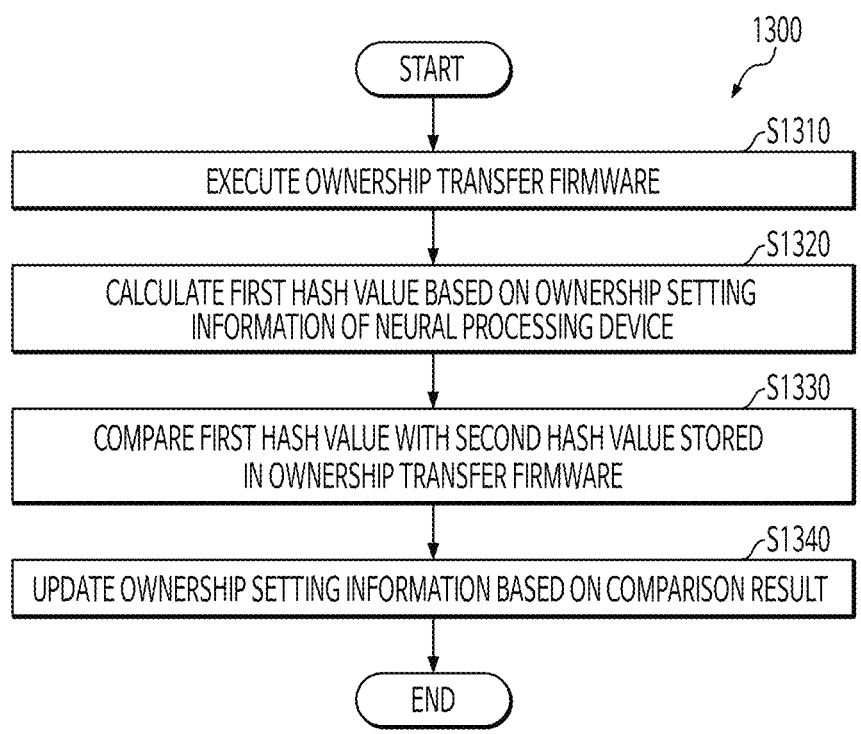
FIG. 13 is a flowchart illustrating an example of a method for transferring ownership of the neural processing device according to an embodiment of the present disclosure.

FIG. 13 is a flowchart illustrating an example of a method 1300 for transferring ownership of the neural processing device according to an embodiment of the present disclosure. The method 1300 may be performed by the security core (e.g., the security core 210 of FIG. 2, etc.) of the neural processing device.

The method 1300 may be initiated by executing the ownership transfer firmware, at S1310. The ownership transfer firmware may be firmware stored in the immutable memory of the neural processing device.

The security core may calculate a first hash value based on the ownership setting information of the neural processing device, at S1320. The ownership setting information may include an ownership transfer nonce and an ownership transfer counter, and the security core may calculate the first hash value based on the ownership transfer nonce and the ownership transfer counter.

The security core may compare the first hash value with the second hash value stored in the ownership transfer firmware, at S1330. Finally, the security core may update the ownership setting information based on the comparison result, at S1340. Accordingly, the security core may transfer ownership of the neural processing device from the first user to the second user.

The ownership setting information may include owner key information, and the security core may add a public key of the second user to the owner key information if the first hash value and the second hash value are identical. In addition, the ownership setting information may include an ownership transfer counter, and the security core may set the ownership transfer counter from a first value to a second value if the first hash value and the second hash value are identical.

The ownership setting information may further include owner key validation, and the security core may set the owner key validation from a first value to a second value if the first hash value and the second hash value are identical. In addition, the ownership setting information may further include owner key revocation, and the security core may set the owner key revocation to a first value if the first hash value and the second hash value are identical.

The neural processing device may further include a second non-volatile memory storing the first stage boot loader, and the immutable memory may further store the second stage boot loader. In this case, the security core may execute the first stage boot loader, load and verify the second stage boot loader based on the first stage boot loader, execute the verified second stage boot loader, and load and verify the ownership transfer firmware based on the second stage boot loader.

The security core may decrypt an encryption code of the second stage boot loader with a public key associated with the second stage boot loader to calculate a hash value of the second stage boot loader, and verify the second stage boot loader based on the calculated hash value of the second stage boot loader. In this case, the encryption code of the second stage boot loader may be encrypted based on a private key associated with the second stage boot loader. If verification of the second stage boot loader fails, the security core may execute the recovery process.

The second stage boot loader may verify the ownership transfer firmware based on the ownership setting information. The second stage boot loader may verify a signature stored in the ownership transfer firmware using a public key of a first user included in the ownership setting information, and the signature may be generated based on the private key of the first user.

After the ownership of the neural processing device is transferred from the first user to the second user, the security core may encrypt or decrypt the data stored in the neural processing device based on the encryption key of the second user. In this case, the encryption key of the second user may include a first encryption key input by the second user. Additionally or alternatively, the neural processing device further includes an encryption engine that generates an encryption key associated with the second user in response to the transfer of ownership of the neural processing device, and the encryption key of the second user includes a second encryption key generated by the encryption engine.

The ownership setting information may include a vendor key associated with the vendor of the neural processing device. In addition, the second user may include the vendor, and the security core may transfer ownership of the neural processing device from the first user to the vendor based on the vendor key. In this case, the security core may restrict the authority of the vendor associated with the neural processing device such that the vendor has access to only some regions of the predefined neural processing device.

The flowchart illustrated in FIG. 13 and the above description are merely examples, and may be implemented differently in some other examples. For example, in some aspects, the order of respective operations may be changed, some of the operations may be repeatedly performed, some may be omitted, or some may be added.

The functions performed by each of the configurations described above or the methods described above may be provided as a computer program stored in a computer-readable recording medium for execution on a computer. The medium may be a type of medium that continuously stores a program executable by a computer, or temporarily stores the program for execution or download. In addition, the medium may refer to a variety of recording means or storage means that have a single piece of hardware or a combination of several pieces of hardware, and the medium is not limited to those that are directly connected to any computer system, and the medium may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, a ROM, a RAM, and a flash memory. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchange of hardware and software, various exemplary components, blocks, modules, circuits, and steps have generally been described above from their functional perspective. Whether such a function is implemented as hardware or software depends on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as Random Access Memory (RAM), Read-Only Memory (ROM), Non-Volatile Random Access Memory (NVRAM), Programmable Read-Only Memory (PROM), Erasable Programmable Read-Only memory (EPROM), Electrically Erasable PROM (EEPROM), flash memory, compact disc (CD), magnetic or marking data storage devices, etc. The commands may be executable by at least one processor, and may cause the processor(s) to perform certain aspects of the functions described in the present disclosure.

If implemented in software, the techniques described above may be stored on a computer-readable medium as one or more commands or codes, or may be transferred via a computer-readable medium. The computer-readable media include both the computer storage media and the communication media including any medium that facilitates the transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may be present in the ASIC. The ASIC may be present in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable apparatus.

Although the present disclosure has been described herein in connection with some aspects, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A neural processing device, comprising:
an immutable memory configured to store ownership setting information of the neural processing device;
a first non-volatile memory configured to store ownership transfer firmware;
a second non-volatile memory configured to store a first stage boot loader, wherein the immutable memory is further configured to store a second stage boot loader; and
a security core comprising one or more processors is configured to:
execute the first stage boot loader;
load and verify the second stage boot loader based on the first stage boot loader;
execute the verified second stage boot loader;
load and verify the ownership transfer firmware based on the verified second stage boot loader, wherein the verified second stage boot loader is configured to verify a signature stored in the ownership transfer firmware using a public key of a first user included in the ownership setting information, wherein the ownership setting information further includes an ownership transfer nonce and an ownership transfer counter;
execute the verified ownership transfer firmware;
transfer ownership of the neural processing device from the first user to a second user based on the ownership setting information;
after transferring the ownership of the neural processing device from the first user to the second user, encrypt or decrypt data stored in the neural processing device based on an encryption key of the second user.

2. The neural processing device according to claim 1, wherein the security core is configured to:
calculate a first hash value based on the ownership setting information;
compare the first hash value with a second hash value stored in the ownership transfer firmware; and
update the ownership setting information based on the comparison result.

3. The neural processing device according to claim 2, wherein the security core is configured to calculate the first hash value based on the ownership transfer nonce and the ownership transfer counter.

4. The neural processing device according to claim 1, wherein the security core is configured to execute a recovery process if verification of the second stage boot loader fails.

5. The neural processing device according to claim 1, wherein the second stage boot loader is configured to verify the ownership transfer firmware based on the ownership setting information.

6. The neural processing device according to claim 5, wherein the signature is generated based on a private key of the first user.

7. The neural processing device according to claim 1, wherein the encryption key of the second user comprises a first encryption key input by the second user.

8. The neural processing device according to claim 1, wherein
the neural processing device further comprises an encryption engine configured to generate the encryption key associated with the second user in response to the transfer of the ownership of the neural processing device, and
the encryption key of the second user comprises a second encryption key generated by the encryption engine.

9. The neural processing device according to claim 1, wherein the ownership setting information comprises a vendor key associated with a vendor of the neural processing device.

10. The neural processing device according to claim 9, wherein the second user comprises the vendor, and the security core is configured to transfer the ownership of the neural processing device from the first user to the vendor based on the vendor key.

11. The neural processing device according to claim 10, wherein the security core is configured to restrict an authority of the vendor associated with the neural processing device such that the vendor has access to only a predefined portion of areas of the neural processing device.

12. A method for transferring ownership of a neural processing device, the method being performed by a security core comprising one or more processors and comprising:
executing a first stage boot loader;
loading and verifying a second stage boot loader based on the first stage boot loader;
executing the verified second stage boot loader;
loading and verifying ownership transfer firmware based on the verified second stage boot loader, the verified second stage boot loader is configured to verify a signature stored in the ownership transfer firmware using a public key of a first user included in ownership setting information, wherein the ownership setting information further includes an ownership transfer nonce and an ownership transfer counter;
executing the verified ownership transfer firmware;
transferring ownership of the neural processing device from the first user to a second user based on the ownership setting information of the neural processing device; and
encrypting or decrypting data stored in the neural processing device based on an encryption key of the second user.

13. The method according to claim 12, wherein the security core comprising the one or more processors is configured to perform steps of:
calculating a first hash value based on the ownership setting information comprising the ownership transfer nonce and the ownership transfer counter;
comparing the first hash value with a second hash value stored in the ownership transfer firmware; and
updating the ownership setting information based on the comparison result.

14. The method according to claim 12, wherein the security core comprising the one or more processors is further configured to perform steps of:
generating the encryption key associated with the second user in response to the transferring of the ownership of the neural processing device, wherein the encryption key of the second user comprises a second encryption key generated by an encryption engine.

15. The method according to claim 12, wherein the security core comprising the one or more processors is further configured to perform steps of:
executing a recovery process if verification of the second stage boot loader fails.

16. The method according to claim 12, wherein
the ownership setting information comprises a vendor key associated with a vendor of the neural processing device, and the second user comprises the vendor; and
the security core comprising the one or more processors is further configured to perform steps of:
transferring the ownership of the neural processing device from the first user to the vendor based on the vendor key; and
restricting an authority of the vendor associated with the neural processing device such that the vendor has access to only a predefined portion of areas of the neural processing device.

17. A non-transitory computer-readable recording medium storing instructions that, when executed by a security core comprising one or more processors, causing the security core to perform steps of:
executing a first stage boot loader;
loading and verifying a second stage boot loader based on the first stage boot loader;
executing the verified second stage boot loader;
loading and verifying ownership transfer firmware based on the verified second stage boot loader, wherein the verified second stage boot loader is configured to verify a signature stored in the ownership transfer firmware using a public key of a first user included in ownership setting information;
executing the verified ownership transfer firmware;
transferring ownership of the neural processing device from the first user to a second user based on the ownership setting information of the neural processing device, wherein the ownership setting information further includes an ownership transfer nonce and an ownership transfer counter; and
encrypting or decrypting data stored in the neural processing device based on an encryption key of the second user.

18. The non-transitory computer-readable recording medium according to claim 17, wherein the security core is configured to perform the steps of:

calculating a first hash value based on the ownership setting information comprising the ownership transfer nonce and the ownership transfer counter;
comparing the first hash value with a second hash value stored in the ownership transfer firmware; and
updating the ownership setting information based on the comparison result.

19. The non-transitory computer-readable recording medium according to claim 17, wherein
the ownership setting information comprises a vendor key associated with a vendor of the neural processing device, and the second user comprises the vendor; and
the security core is further configured to perform steps of:
transferring the ownership of the neural processing device from the first user to the vendor based on the vendor key; and
restricting an authority of the vendor associated with the neural processing device such that the vendor has access to only a predefined portion of areas of the neural processing device.

20. The non-transitory computer-readable recording medium according to claim 17, wherein the security core is further configured to perform the steps of: executing a recovery process if verification of the second stage boot loader fails.

* * * * *